US011396943B2

(12) United States Patent
Tabata et al.

(10) Patent No.: US 11,396,943 B2
(45) Date of Patent: Jul. 26, 2022

(54) CONTROL DEVICE FOR GEAR SHIFTING DEVICE, CONTROL SYSTEM FOR GEAR SHIFTING DEVICE, AND EXTERNAL ARITHMETIC OPERATION DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Kota Fujii, Nissin (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/326,930

(22) Filed: May 21, 2021

(65) Prior Publication Data

US 2021/0388897 A1 Dec. 16, 2021

(30) Foreign Application Priority Data

Jun. 10, 2020 (JP) .............................. JP2020-100833

(51) Int. Cl.
*F16H 61/12* (2010.01)
*F16H 61/28* (2006.01)
*F16H 61/68* (2006.01)

(52) U.S. Cl.
CPC ......... *F16H 61/12* (2013.01); *F16H 61/2807* (2013.01); *F16H 61/68* (2013.01); *F16H 2061/1216* (2013.01); *F16H 2061/1228* (2013.01); *F16H 2061/1244* (2013.01); *F16H 2061/1248* (2013.01); *F16H 2061/1288* (2013.01)

(58) Field of Classification Search
CPC ...... F16H 61/12; F16H 61/2807; F16H 61/68; F16H 2061/1216; F16H 2061/1228; F16H 2061/1244; F16H 2061/1248; F16H 2061/1288
See application file for complete search history.

(56) References Cited

U.S. PATENT DOCUMENTS

| 5,890,078 A | * | 3/1999 | Furuta | .................. | B60W 10/04 701/1 |
| 2002/0002430 A1 | * | 1/2002 | Nada | ..................... | B60W 20/50 701/33.4 |
| 2007/0161449 A1 | | 7/2007 | Hayashi et al. | | |
| 2017/0254412 A1 | * | 9/2017 | Inoue | .................... | F16H 61/662 |

FOREIGN PATENT DOCUMENTS

JP 2007-177932 A 7/2007

* cited by examiner

*Primary Examiner* — Edwin A Young
(74) *Attorney, Agent, or Firm* — Oliff PLC

(57) ABSTRACT

A control device provided in a gear shifting device includes an electronic control unit. The electronic control unit determines whether an abnormality of the gear shifting device has occurred, performs a fail-safe process of switching the frictional engagement element corresponding to an abnormality to a disengaged state and fixing the gear shift ratio of the gear shifting device when it is determined that an abnormality has occurred, determines whether the abnormality has been relieved based on a behavior of an input signal at the time of operating a drive device of the frictional engagement element corresponding to an abnormality on condition that the frictional engagement element is maintained in the disengaged state after it is determined that the abnormality has occurred, and releases the fail-safe process when it is determined that the abnormality has been relieved.

13 Claims, 11 Drawing Sheets

FIG. 7

| y(1) | MIXTURE OF AIR |
| --- | --- |
| y(2) | TEMPORARY STICK |
| y(3) | FULL STICK |
| ⋮ | ⋮ |

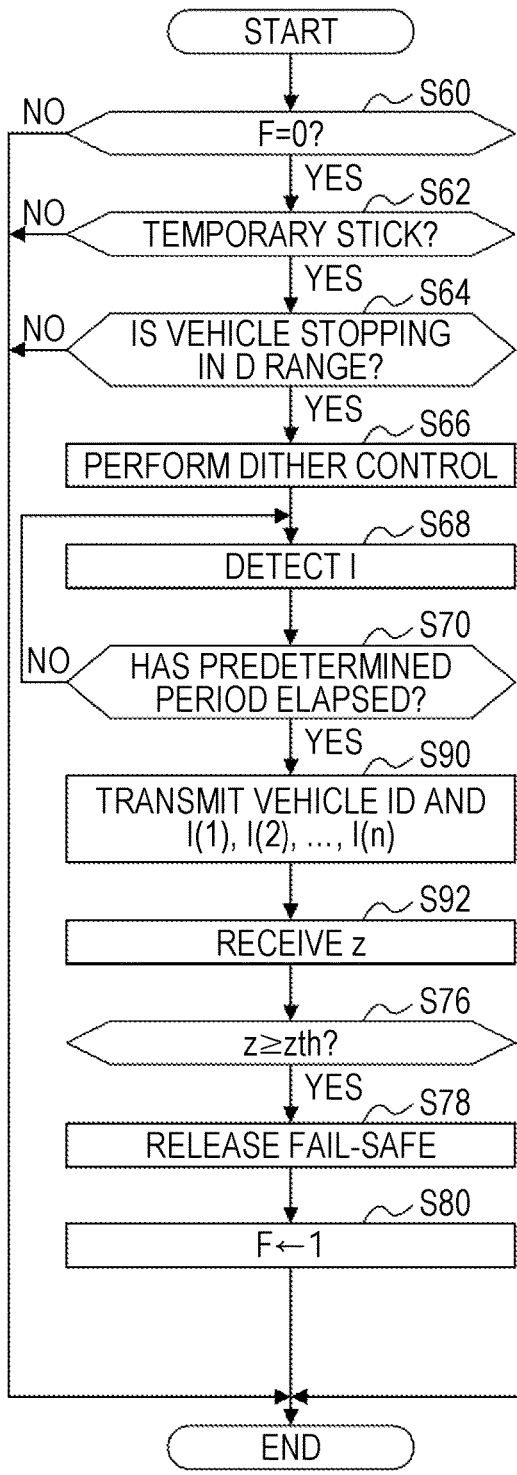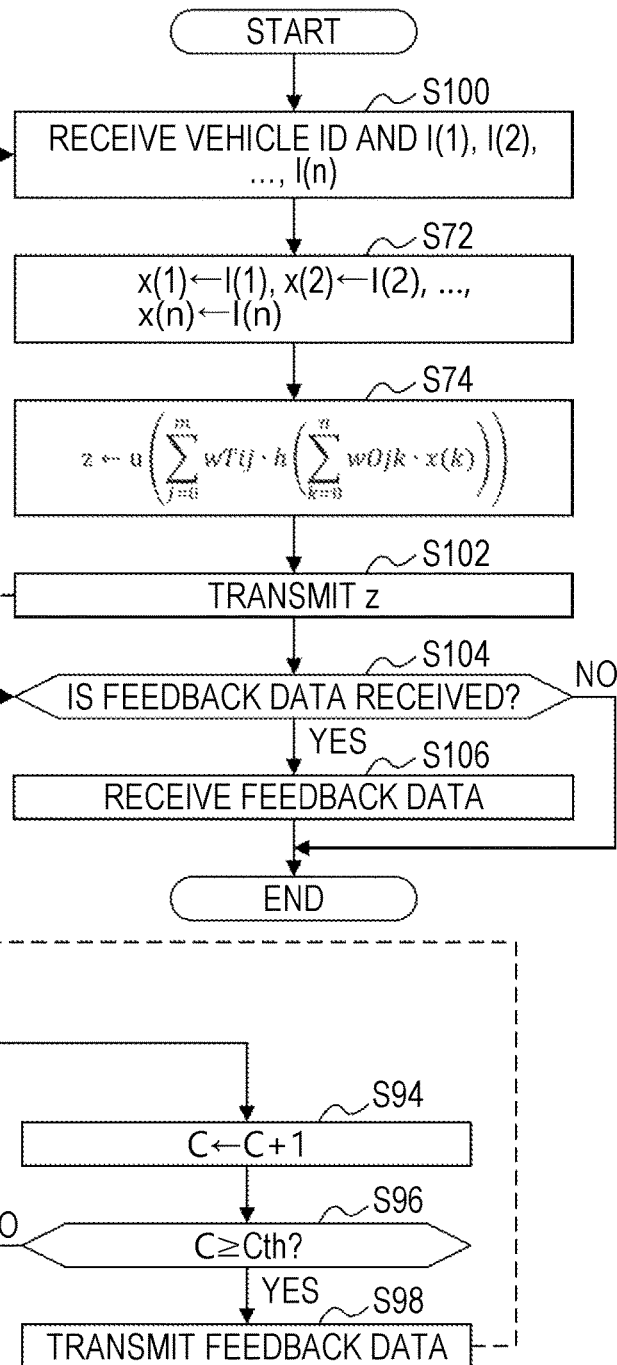
FIG. 10A
FIG. 10B

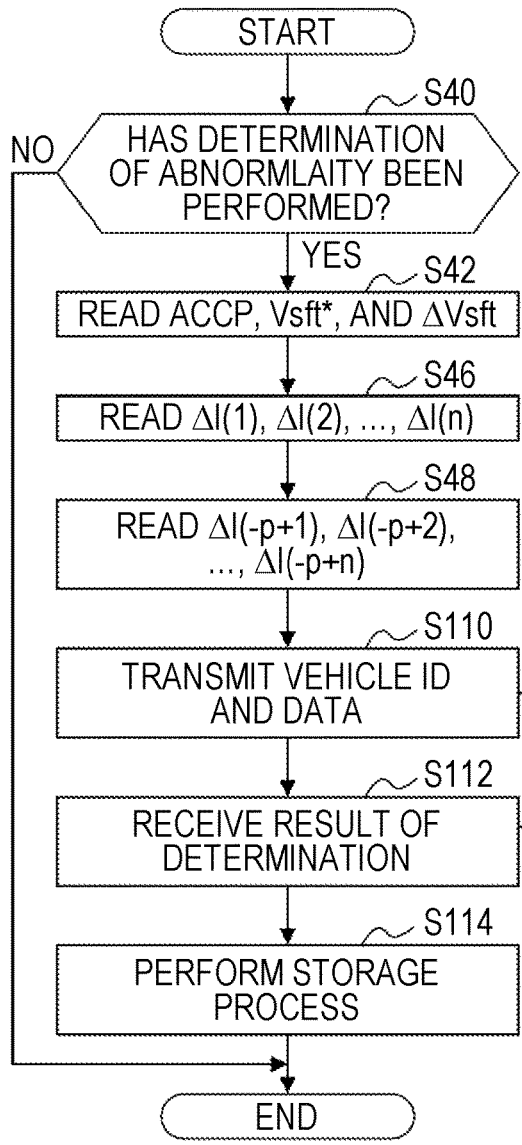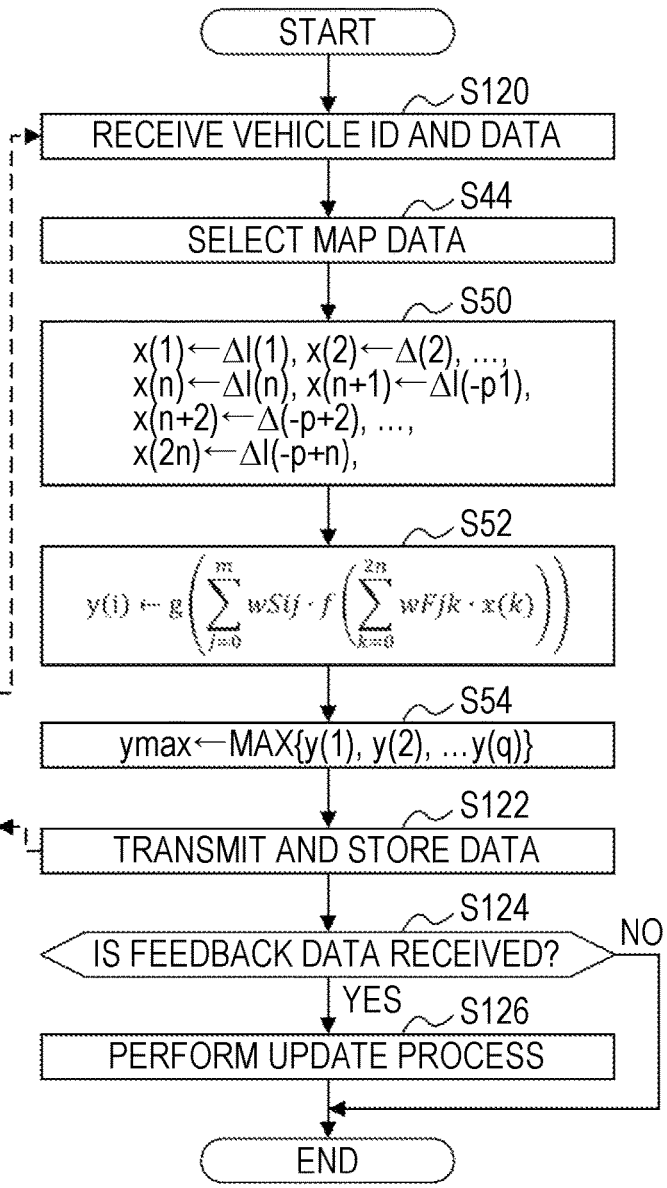

CONTROL DEVICE FOR GEAR SHIFTING DEVICE, CONTROL SYSTEM FOR GEAR SHIFTING DEVICE, AND EXTERNAL ARITHMETIC OPERATION DEVICE

CROSS-REFERENCE TO RELATED APPLICATION

This application claims priority to Japanese Patent Application No. 2020-100833 filed on Jun. 10, 2020, incorporated herein by reference in its entirety.

BACKGROUND

1. Technical Field

The disclosure relates to a control device for a gear shifting device, a control system for a gear shifting device, and an external arithmetic operation device.

2. Description of Related Art

A device that fixes a gear shift ratio when an abnormality occurs in an automatic gear shifting device is described in Japanese Unexamined Patent Application Publication No. 2007-177932 (JP 2007-177932 A).

SUMMARY

An abnormality in an automatic gear shifting device may be naturally relieved in a short time. In this case, with the aforementioned device, the gear shift ratio is kept fixed even after an abnormality has been naturally relieved.

Therefore, the disclosure provides a control device for a gear shifting device, a control system for a gear shifting device, and an external arithmetic operation device that can rapidly return a gear shift ratio to a normal value when an abnormality occurs in the gear shifting device. According to the disclosure, there are provided a control device for a gear shifting device, a control system for a gear shifting device, and an external arithmetic operation device, wherein the gear shifting device is applied to a vehicle, includes frictional engagement elements, and is configured to automatically change a gear shift ratio between an onboard motor and driving wheels. A control device for the gear shifting device according to a first aspect of the disclosure includes an electronic control unit including an abnormality determining process, a fail-safe process, a relief determining process, and a release process. The abnormality determining process is a process of determining whether an abnormality of the gear shifting device has occurred. The fail-safe process is a process of switching the frictional engagement element corresponding to an abnormality to a disengaged state and fixing the gear shift ratio of the gear shifting device when it is determined in the abnormality determining process that an abnormality has occurred. The relief determining process is a process of determining whether the abnormality has been relieved based on a behavior of an input signal at a time of operating a drive device of the frictional engagement element corresponding to an abnormality on condition that the frictional engagement element is maintained in the disengaged state after it is determined in the abnormality determining process that the abnormality has occurred. The release process is a process of releasing the fail-safe process when it is determined in the relief determining process that the abnormality has been relieved.

With the control device for a gear shifting device according to the first aspect, when an abnormality has occurred, the fail-safe process of switching the frictional engagement element corresponding to the abnormality to the disengaged state is performed. Accordingly, it is possible to appropriately transmit power via the gear shifting device even when an abnormality has occurred. With this configuration, the drive device of the frictional engagement element corresponding to the abnormality is operated on condition that the disengaged state of the frictional engagement element is maintained. Here, the behavior of the input signal at the time of operating the drive device tends to vary between when the abnormality has been relieved and when the abnormality has not been relieved. Accordingly, with the control device, it is determined whether the abnormality has been relieved based on the behavior of the input signal at the time of operating the drive device. By releasing the fail-safe process when it is determined that the abnormality has been relieved, it is possible to rapidly return the gear shift ratio of the gear shifting device to a normal value when an abnormality which can be relieved in a short time has occurred.

In the control device for the gear shifting device according to the first aspect, the drive device may include a solenoid valve; and the relief determining process may include a process of determining whether the abnormality has been relieved based on a behavior of a turn-on current as the input signal of the solenoid valve.

With the control device for the gear shifting device having this configuration, when an abnormality has occurred in driving of the solenoid valve, the behavior of the turn-on current tends to be different from that when it is normal. Accordingly, with this configuration, it is possible to accurately determine whether the abnormality of the solenoid valve has been relieved based on the turn-on current.

In the control device for the gear shifting device according to the first aspect, the electronic control unit may include an operation process of operating the drive device of the frictional engagement element corresponding to an abnormality on condition that the frictional engagement element is maintained in the disengaged state when it is determined in the abnormality determining process that the abnormality has occurred and the vehicle stops.

With the control device for the gear shifting device having this configuration, a condition that the vehicle stops is added to the condition for operating the drive device of the frictional engagement element corresponding to the abnormality to determine whether the abnormality has been relieved. Accordingly, even when the frictional engagement element exhibits an unintended behavior due to the operation, it is possible to curb hindrance in travel of the vehicle.

The control device for the gear shifting device according to the first aspect may further include a storage device configured to store map data which is data for defining a map. The electronic control unit may be configured to perform the abnormality determining process, the fail-safe process, the relief determining process, and the release process. The electronic control unit may include an acquisition process of acquiring a behavior variable which is a variable indicating a behavior of the input signal and be configured to perform the acquisition process. The map may include the behavior variable as an input variable and include a relief variable which is a variable indicating whether the abnormality has been relieved as an output variable. The relief determining process may include a process of calculating a value of the relief variable by inputting a value of the behavior variable acquired in the acquisition process to the map.

In the control device for the gear shifting device having this configuration, the drive device may include a solenoid valve and the input variable may include a variable associated with time-series data of a turn-on current of the solenoid valve as the behavior variable.

Since the time-series data of the turn-on current indicates the behavior of the turn-on current, the control device for the gear shifting device having this configuration can construct an appropriate behavior variable from the time-series data.

In the control device for a gear shifting device according to the first aspect, the electronic control unit may include an identification process of identifying a cause of an abnormality when it is determined in the abnormality determining process that an abnormality has occurred and be configured to perform the identification process. The electronic control unit may be configured to perform the relief determining process on condition that the abnormality identified in the identification process is an abnormality associated with engagement of the frictional engagement elements.

For example, an abnormality that gear shifting control cannot be appropriately performed due to deterioration of a hydraulic fluid may occur in the gear shifting device. In this case, since a hydraulic fluid needs to be replaced, natural relief in a short time cannot be expected. On the other hand, an abnormality associated with engagement of a frictional engagement element includes an abnormality of temporary engagement with foreign matter which can be naturally relieved in a short time. Therefore, with the control device for the gear shifting device having this configuration, whether the abnormality is an abnormality associated with engagement of a frictional engagement element or another abnormality is determined through the identification process, and the relief determining process is performed when the abnormality is an abnormality associated with engagement of a frictional engagement element. Accordingly, with this configuration, it is possible to curb useless performing of the relief determining process when an abnormality which cannot be expected to be relieved occurs.

In the control device for a gear shifting device having the aforementioned configuration, the electronic control unit may include an alarm process of notifying that it has been determined in the abnormality determining process that an abnormality has occurred and a storage process of storing data associated with results of identification in the identification process in a storage device and be configured to perform the alarm process and the storage process.

With the control device for the gear shifting device having this configuration, since the results of identification are stored in the storage device, an entity that determines what treatment to perform on the vehicle can determine the treatment based on the result of identification stored in the storage device, for example, when a user having been notified of an alarm drives the vehicle to a repair shop.

The control device for a gear shifting device having the aforementioned configuration may further include a storage device configured to store map data which is data for defining a map. The electronic control unit may include an acquisition process of acquiring a behavior variable which is a variable indicating a behavior of a turn-on current of the gear shifting device and be configured to perform the acquisition process. The map may include the behavior variable as an input variable and include a cause variable which is a variable indicating a type of the abnormality as an output variable. The identification process may include a process of calculating a value of the cause variable by inputting a value of the behavior variable acquired in the acquisition process to the map.

In the control device for a gear shifting device having the aforementioned configuration, the gear shifting device may include a solenoid valve. The input variable may include a variable associated with time-series data of a turn-on current of the solenoid valve as the behavior variable.

Since the time-series data of the turn-on current indicates the behavior of the turn-on current, the control device for the gear shifting device having this configuration can construct an appropriate behavior variable from the time-series data.

In the control device for a gear shifting device having the aforementioned configuration, the acquisition process may include a process of acquiring a value of the behavior variable at a previous timing in addition to the value of the behavior variable when it is determined in the abnormality determining process that an abnormality has occurred. The identification process may include a process of calculating the value of the cause variable by simultaneously inputting the value of the behavior variable when it is determined in the abnormality determining process that an abnormality has occurred and the value of the behavior variable at the previous timing to the map.

With the control device for the gear shifting device having this configuration, it is possible to calculate a value of the cause variable in consideration of a history and trends in the behavior of the input signal by adding the behavior variable before an abnormality is determined to have occurred to the input variable.

A control system for a gear shifting device according to a second aspect of the disclosure includes the control device. The electronic control unit used in the control device includes a first electronic control unit that is provided in the vehicle and a second electronic control unit that is not provided in the vehicle. The drive device includes a solenoid valve. The first electronic control unit is configured to perform at least the abnormality determining process, the fail-safe process, the release process, and a data transmitting process of transmitting data associated with a turn-on current of the solenoid valve. The second electronic control unit is configured to perform at least the relief determining process.

With the control device for the gear shifting device according to the second aspect, by allowing the second electronic control unit to perform the relief determining process, it is possible to decrease a calculation load of the first electronic control unit in comparison with a case in which the relief determining process is performed by the first electronic control unit.

A control system for a gear shifting device according to a third aspect of the disclosure includes the control device. The electronic control unit used in the control device includes a first electronic control unit that is provided in the vehicle and a second electronic control unit that is not provided in the vehicle. The drive device includes a solenoid valve. The first electronic control unit is configured to perform at least the abnormality determining process, the fail-safe process, the release process, and a data transmitting process of transmitting data associated with a turn-on current of the solenoid valve. The second electronic control unit is configured to perform at least the identification process.

With the control system for the gear shifting device according to the third aspect, by allowing the second electronic control unit to perform the identification process, it is possible to decrease a calculation load of the first electronic control unit in comparison with a case in which the identification process is performed by the first electronic control unit.

In the control system for a gear shifting device having the aforementioned configuration, the second electronic control unit may be configured to perform a reception process of receiving data transmitted in the data transmitting process from a plurality of vehicles and an update process of calculating a value of the output variable by inputting the input variable based on the data received in the reception process to the map and updating the map data such that the calculated value is a target value.

With the control device for the gear shifting device having this configuration, by updating the map data based on data transmitted from a plurality of vehicles, it is possible to obtain data that can be used to more accurately calculate a value of the output variable in actual traveling of a vehicle.

The control device for the gear shifting device according to a fourth aspect of the disclosure provides the first electronic control unit that is provided in the vehicle and used in the control system.

An external arithmetic operation device according to a fifth aspect of the disclosure provides: the second electronic control unit that is provided outside of the vehicle and used in the control system for the gear shifting device; and the storage device that is provided outside of the vehicle and used in the control system for the gear shifting device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating definition of output variables according to the first embodiment;

FIG. 10A is a flowchart illustrating a process flow which is performed by the system according to the second embodiment;

FIG. 10B is a flowchart illustrating a process flow which is performed by the system according to the second embodiment;

FIG. 11A is a flowchart illustrating a process flow which is performed by the system according to the second embodiment; and FIG. 11B is a flowchart illustrating a process flow which is performed by the system according to the second embodiment.

DETAILED DESCRIPTION OF EMBODIMENTS

Figure 1:
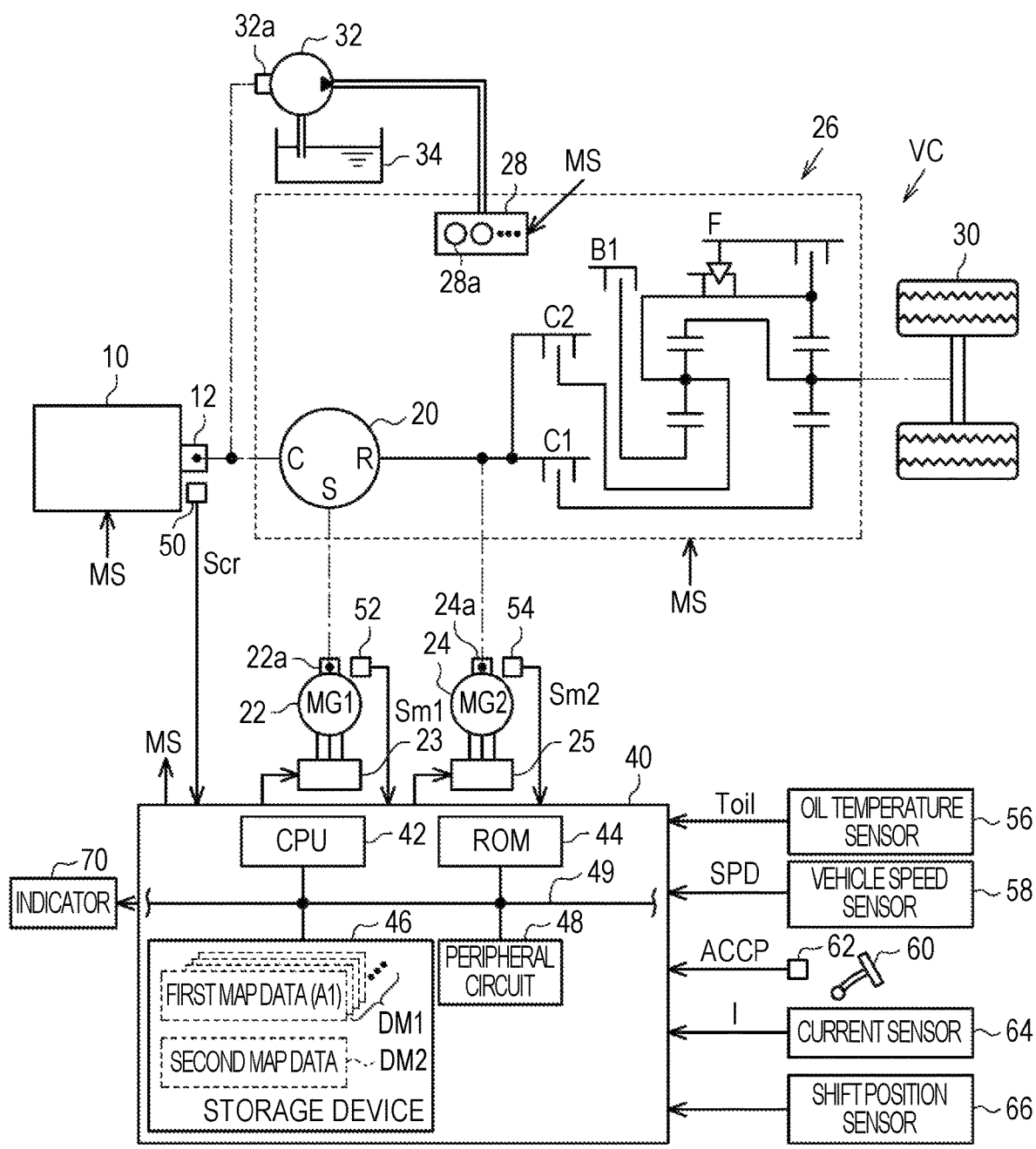
FIG. 1 is a diagram illustrating a configuration of a drive system and a control device for a vehicle according to a first embodiment of the disclosure.

Hereinafter, a first embodiment will be described with reference to the accompanying drawings. As illustrated in FIG. 1, a power split device 20 is mechanically connected to a crank shaft 12 of an internal combustion engine 10. The power split device 20 splits power of the internal combustion engine 10, a first motor/generator 22, and a second motor/generator 24. The power split device 20 includes a planetary gear mechanism, the crank shaft 12 is mechanically connected to a carrier CR of the planetary gear mechanism, a rotation shaft 22a of the first motor/generator 22 is mechanically connected to a sun gear S, and a rotation shaft 24a of the second motor/generator 24 is mechanically connected to a ring gear R. An output voltage of a first inverter 23 is applied to terminals of the first motor/generator 22. An output voltage of a second inverter 25 is applied to terminals of the second motor/generator 24.

In addition to the rotation shaft 24a of the second motor/generator 24, driving wheels 30 are additionally mechanically connected to the ring gear R of the power split device 20 via a gear shifting device 26. A driven shaft 32a of an oil pump 32 is mechanically connected to the carrier CR. The oil pump 32 is a pump that circulates oil in an oil pan 34 as a lubricant to the power split device 20 or discharges the oil as a hydraulic fluid to the gear shifting device 26. A pressure of the hydraulic fluid discharged from the oil pump 32 is adjusted by a hydraulic pressure control circuit 28 in the gear shifting device 26 and is used as a hydraulic fluid. The hydraulic pressure control circuit 28 is a circuit that includes a plurality of solenoid valves 28a and controls a flow state of the hydraulic fluid or a hydraulic pressure of the hydraulic fluid by turning on the solenoid valves 28a.

A control device 40 controls the internal combustion engine 10 and operates various operation units of the internal combustion engine 10 to control a torque, an exhaust gas component ratio, and the like as control values thereof. The control device 40 controls the first motor/generator 22 and operates the first inverter 23 to control a torque, a rotation speed, and the like as control values thereof. The control device 40 controls the second motor/generator 24 and operates the second inverter 25 to control a torque, a rotation speed, and the like as control values thereof.

The control device 40 controls the control values with reference to an output signal Scr of a crank angle sensor 50, an output signal Sm1 of a first rotational angle sensor 52 that detects a rotational angle of the rotation shaft 22a of the first motor/generator 22, or an output signal Sm2 of a second rotational angle sensor 54 that detects a rotational angle of the rotation shaft 24a of the second motor/generator 24. The control device 40 also refers to an oil temperature Toil which is a temperature of oil detected by an oil temperature sensor 56, a vehicle speed SPD detected by a vehicle speed sensor 58, or an accelerator operation amount ACCP which is an amount of depression of an accelerator pedal 60 detected by an accelerator sensor 62. The control device 40 refers to a current I flowing in the solenoid valves 28a which is detected by a current sensor 64 or a shift position which is detected by a shift position sensor 66. The current sensor 64 actually includes a plurality of dedicated sensors that detects currents of the plurality of solenoid valves 28a.

The control device 40 includes an electronic control unit (ECU) including a CPU 42 and a ROM 44, a storage device 46 which is an electrically rewritable nonvolatile memory, and a peripheral circuit 48, which can communicate with each other via a local network 49. Here, the peripheral circuit 48 includes a circuit that generates a clock signal for defining internal operations, a power supply circuit, and a reset circuit. The control device 40 controls the control values by causing the CPU 42 to execute a program stored in the ROM 44.

Figure 2:
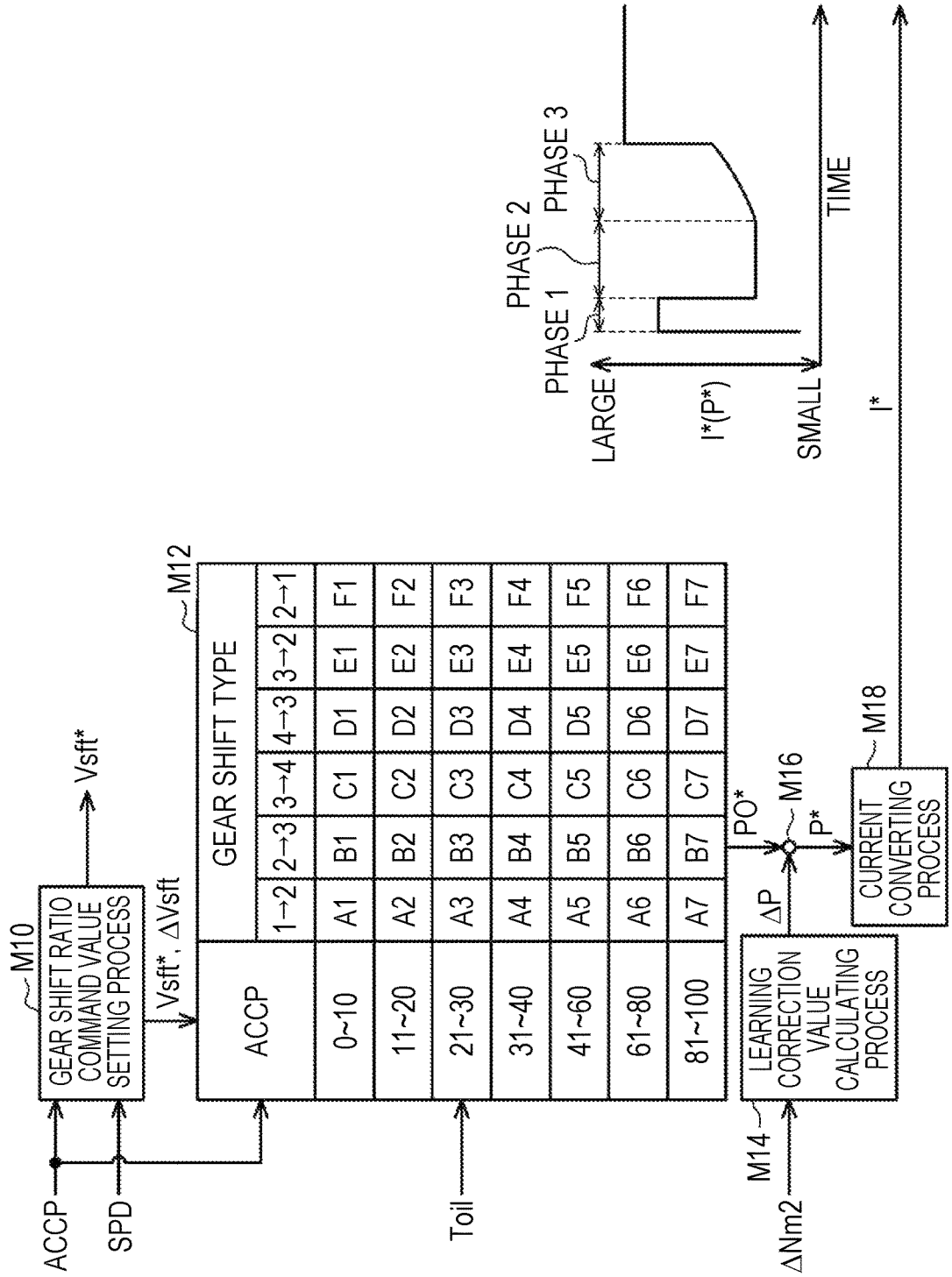
FIG. 2 is a block diagram illustrating processes which are performed by the control device according to the first embodiment.

FIG. 2 illustrates some processes which are performed by the control device 40. The processes illustrated in FIG. 2 are realized by causing the CPU 42 to repeatedly execute a program stored in the ROM 44, for example, at intervals of a predetermined period.

A gear shift ratio command value setting process M10 is a process of setting a gear shift ratio command value Vsft* which is a command value of a gear shift ratio based on the accelerator operation amount ACCP and the vehicle speed SPD. A hydraulic pressure command value setting process M12 is a process of setting a hydraulic pressure command value P0* which is a base value of a command value of a hydraulic pressure adjusted by a solenoid valve used for switching based on the accelerator operation amount ACCP, the oil temperature Toil, the gear shift ratio command value Vsft*, and a shift variable ΔVsft at the time of switching the gear shift ratio. Here, the shift variable ΔVsft indicates whether switching of the gear shift ratio is upshift or downshift. Accordingly, when the gear shift ratio command value Vsft* indicates a third gear stage and the shift variable ΔVsft is upshift, it means that a gear shift type is a shift from the third gear stage to a fourth gear stage. The hydraulic pressure command value setting process M12 is realized by causing the CPU 42 to map-calculate the hydraulic pressure command value P0* in a state in which map data with the accelerator operation amount ACCP, the gear shift type, and the oil temperature Toil as input variables and with the hydraulic pressure command value P0* as an output variable is stored in advance in the ROM 44. Map data is combination data of discrete values of input variables and values of output variables corresponding to the values of the input variables. The map calculation may be, for example, a process of outputting the value of the corresponding output variable of the map data as a result of calculation when a value of one input variable matches one of the values of the input variables of the map data and outputting a value obtained by interpolation of values of a plurality of output variables included in the map data as a result of calculation when the value of one input variable does not match any value of the input variables.

Specifically, the hydraulic pressure command value P0* includes Phase 1, Phase 2, and Phase 3 illustrated in FIG. 2. Here, Phase 1 is a period from a time at which a gear shift ratio switching command has been issued to a time at which a predetermined period has elapsed therefrom. Phase 2 is a period until a torque phase ends, and Phase 3 is a period until switching of the gear shift ratio ends. In Phase 3, the value of the output variable of the map data is actually set to a rate of increase of the hydraulic pressure command value P0*.

A learning correction value calculating process M14 is a process of calculating a correction value ΔP for correcting the hydraulic pressure command value P0* based on a blow amount ΔNm2 which is a difference between a rotation speed Nm2 of the rotation shaft 24a of the second motor/generator 24 and a reference rotation speed Nm2*. Here, the rotation speed Nm2 is calculated based on an output signal Sm2 of the second rotational angle sensor 54 by the CPU 42. The CPU 42 sets the gear shift type and the vehicle speed SPD as inputs for the reference rotation speed Nm2. This process can be realized by causing the CPU 42 to map-calculate the rotation speed Nm2* in a state in which map data with the gear shift type and the vehicle speed SPD as input variables and with the reference rotation speed Nm2* as an output variable is stored in advance in the ROM 44.

A correction process M16 is a process of calculating a hydraulic pressure command value P* by adding the correction value ΔP to the hydraulic pressure command value P0*. A current converting process M18 is a process of converting the hydraulic pressure command value P* to a command value of a current (a current command value I*) flowing in the solenoid valves 28a.

When the value of the gear shift ratio command value Vsft* changes, the control device 40 switches frictional engagement elements from a disengaged state to an engaged state by changing the current command value I* for each phase as illustrated in FIG. 2. The hydraulic pressure command value or the current command value corresponding to a frictional engagement element which is switched from the engaged state to the disengaged state can also be calculated by map calculation based on the aforementioned map data.

Figure 3:
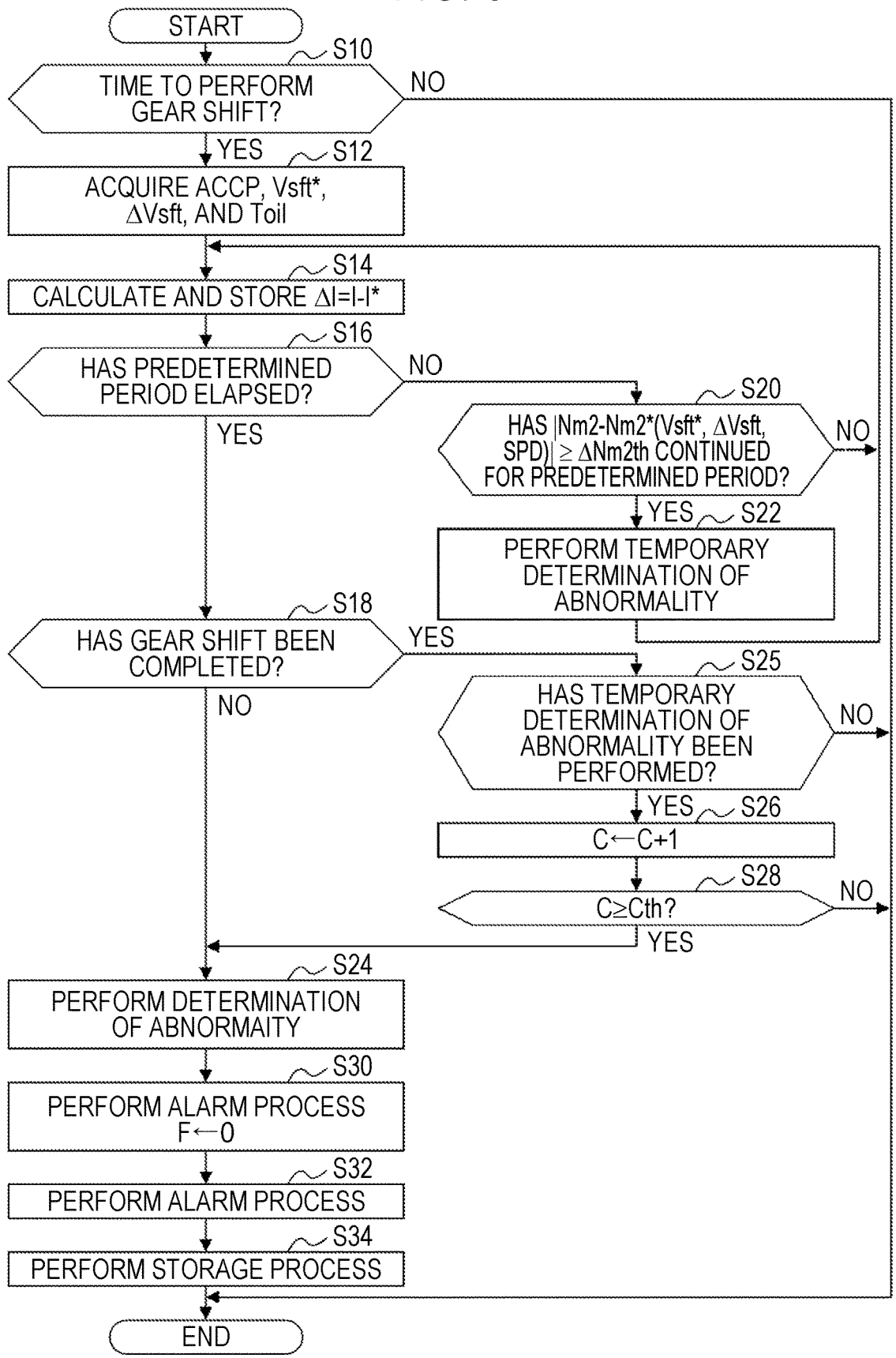
FIG. 3 is a flowchart illustrating a process flow which is performed by the control device according to the first embodiment.

FIG. 3 illustrates a flow of processes which are performed by the control device 40. The flow of processes illustrated in FIG. 3 is realized by causing the CPU 42 to repeatedly execute a program stored in the ROM 44, for example, at intervals of a predetermined period. In the following description, a numeral prefixed with "S" denotes a step number of each process.

In the series of processes illustrated in FIG. 3, the CPU 42 first determines whether it is time to control switching of the gear shift ratio (S10). When it is determined that it is time to control switching of the gear shift ratio (S10: YES), the CPU 42 acquires the accelerator operation amount ACCP, the gear shift ratio command value Vsft*, the shift variable ΔVsft, and the oil temperature Toil (S12). The CPU 42 calculates a current difference ΔI which is a difference between the current I flowing in the solenoid valves 28a for switching the frictional engagement elements which are switched from the disengaged state to the engaged state with this switching and the current command value I*, and stores the calculated current difference ΔI in the storage device 46 (S14).

Then, the CPU 42 determines whether a predetermined period has elapsed after the gear shift command has been issued (S16). Here, the predetermined period is set based on a maximum value of a time which is required for completion of gear shift control. When it is determined that the predetermined period has not yet elapsed (S16: NO), the CPU 42 determines whether a state in which an absolute value of the difference between the rotational speed Nm2 of the rotation shaft 24a of the second motor/generator 24 and the reference rotation speed Nm2* is equal to or greater than a threshold value ΔNm2*th* is continued for a predetermined time or more (S20). This process is a process of determining whether an abnormality has occurred in gear shift control.

Figure 4:
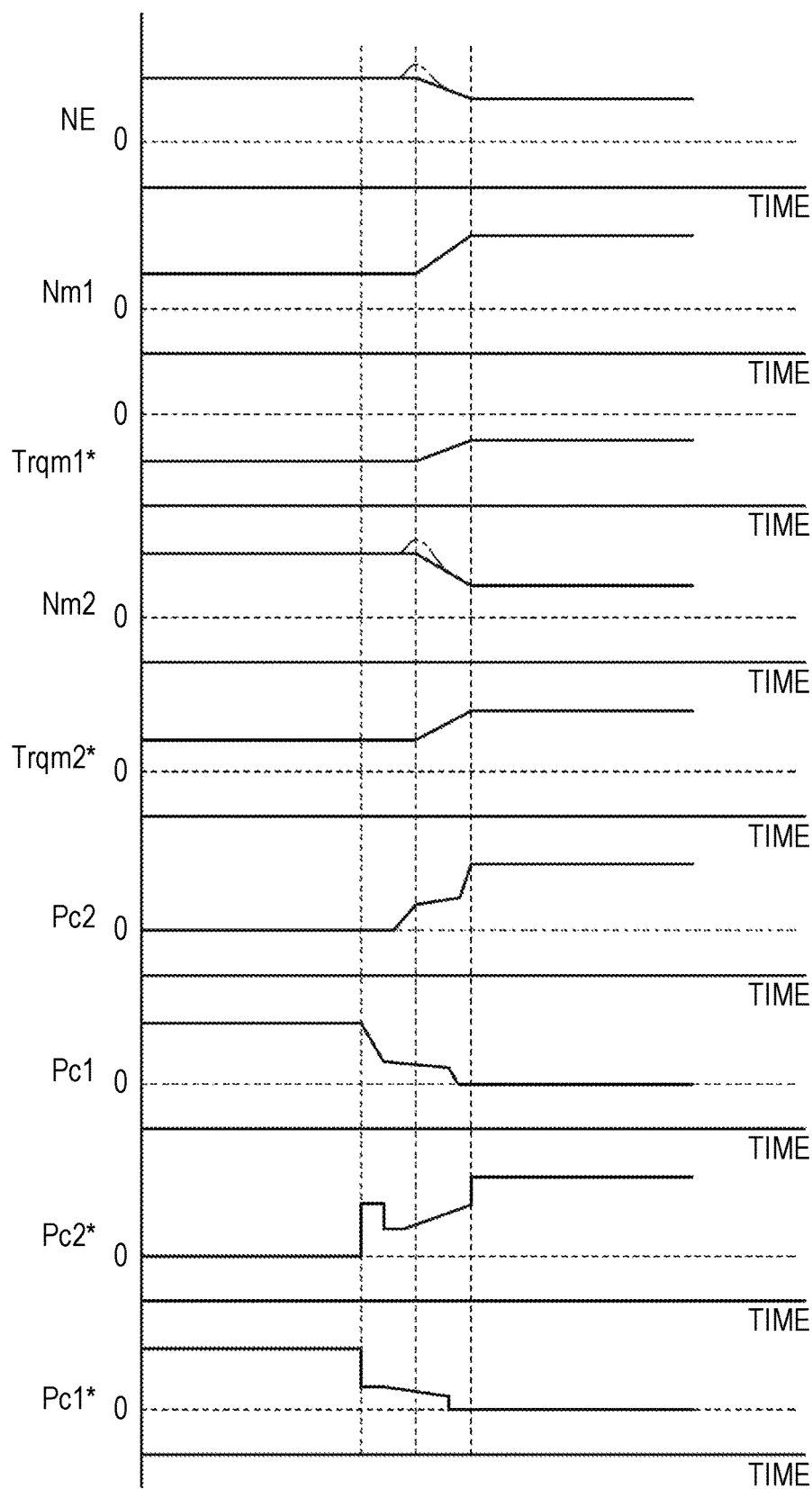
FIG. 4 is a timing chart illustrating blow amounts according to the first embodiment.

That is, when an abnormality occurs in gear shift control, a phenomenon in which an input-side rotation speed of the gear shifting device 26 increases greatly or the like occurs. Accordingly, as indicated by a one-dot chain line in FIG. 4, a phenomenon in which the rotation speed NE of the crank shaft 12 or the rotation speed Nm2 of the rotation shaft 24a of the second motor/generator 24 increases occurs. FIG. 4 illustrates changes of hydraulic pressures Pc2 and Pc1 and command values Pc2* and Pc1* thereof together with changes of the rotation speeds NE, Nm1, and Nm2, and torque command values Trqm1* and Trqm2*. Here, the rotation speed NE is the rotation speed of the crank shaft 12, and the rotation speed Nm1 is the rotation speed of the rotation shaft 22a of the first motor/generator 22. The torque command value Trqm1* is a torque command value for the first motor/generator 22 and the torque command value Trqm2* is a torque command value for the second motor/generator 24. The hydraulic pressure Pc2 and the hydraulic pressure Pc1 are a hydraulic pressure of an engagement-side element and a hydraulic pressure of disengagement-side element out of the frictional engagement elements which are required for gear shift illustrated in FIG. 4.

The command values Pc2* and Pc1* are set such that occurrence of a phenomenon in which the input-side rotation speed of the gear shifting device 26 increases or the like is curbed. The rotation speed Nm2* serving as a reference at the time of gear shift is determined by this setting.

Referring back to FIG. 3, when it is determined that the state is continued for the predetermined time or more (S20: YES), the CPU 42 temporarily determines that an abnormality has occurred (S22). The CPU 42 returns the process flow to the process of S14 when the process of S22 has been completed or when the determination result of the process of S20 is negative.

On the other hand, when it is determined that the predetermined period has elapsed (S16: YES), the CPU 42 determines whether the gear shift has not been completed (S18). Here, the CPU 42 can determine that the gear shift has not been completed when the actual gear shift ratio has not reached the gear shift ratio command value Vsft*. When it is determined that the gear shift has not been completed (S18: NO), the CPU 42 determines that an abnormality has occurred (S24).

On the contrary, when it is determined that the gear shift has been completed (S18: YES), the CPU 42 determines whether temporary determination of an abnormality has been performed (S25). When it is determined that temporary determination of an abnormality has been performed (S25: YES), the CPU 42 increments a counter C by "1" (S26). Then, when the CPU 42 determines whether the value of the counter C is equal to or greater than a predetermined value Cth which is greater than "1" (S28). When it is determined that the value of the counter C is equal to or greater than the predetermined value Cth (S28: YES), the CPU 42 performs the process of S24. When the process of S24 is completed, the CPU 42 performs a fail-safe process of fixing the gear shift ratio to a predetermined gear shift ratio and substitutes "0" into a fail flag F (S30). The predetermined gear shift ratio is a gear shift ratio at which a frictional engagement element which has to be in the engaged state when an abnormality occurs is switched to the disengaged state. The fail flag F is a flag which is "0" when the fail-safe process is being performed and which is "1" otherwise.

The CPU 42 performs an alarm process of causing an indicator 70 to display visual information indicating that an abnormality has occurred by operating the indicator 70 illustrated in FIG. 1 (S32). Then, the CPU 42 stores data indicating that the determination of an abnormality has been performed and the accelerator operation amount ACCP, the gear shift ratio command value Vsft*, the shift variable ΔVsft, and the oil temperature Toil when the abnormality has occurred the storage device 46 (S34).

Figure 5:
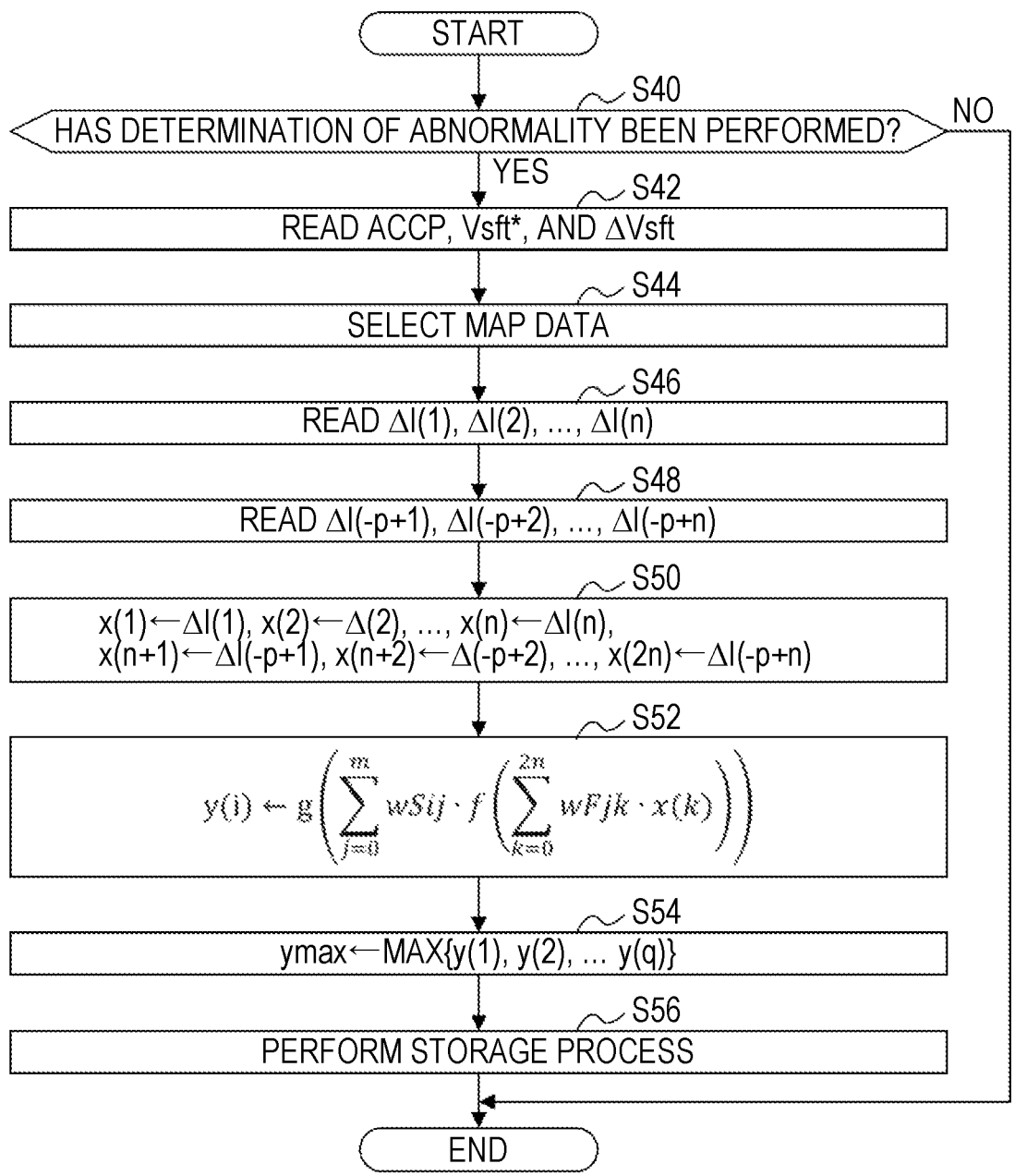
FIG. 5 is a flowchart illustrating a process flow which is performed by the control device according to the first embodiment.

The CPU 42 temporarily ends a series of processes illustrated in FIG. 3 when the process of S34 has been completed or when the determination results of S10, S25, and S28 are negative. FIG. 5 illustrates another flow of processes which are performed by the control device 40. The processes illustrated in FIG. 5 are realized by causing the CPU 42 to repeatedly execute a program stored in the ROM 44, for example, at intervals of a predetermined period.

In a series of processes illustrated in FIG. 5, the CPU 42 first determines whether determination of an abnormality has been performed through the flow of processes illustrated in FIG. 3 (S40). When it is determined that the determination of an abnormality has been performed (S40: YES), the CPU 42 reads the accelerator operation amount ACCP, the gear shift ratio command value Vsft*, and the shift variable ΔVsft stored in the storage device 46 in the process of S34 in FIG. 3 (S42). Then, the CPU 42 selects and reads corresponding first map data DM1 out of the first map data DM1 stored in the storage device 46 illustrated in FIG. 1 based on the accelerator operation amount ACCP and the gear shift type when the abnormality has occurred (S44). That is, first map data DM1 corresponding to areas A1, A2, . . . , A7, B1, . . . subjected to division based on the accelerator operation amount ACCP and the gear shift type used to determine the hydraulic pressure command value P0* in the hydraulic pressure command value setting process M12 illustrated in FIG. 2 is stored in the storage device 46.

Then, the CPU 42 reads current differences ΔI(1), ΔI(2), . . . , and ΔI(n) which are time-series data of the current difference ΔI stored in the process of S14 in FIG. 3 (S46). The current differences ΔI(1), ΔI(2), . . . , and ΔI(n) are time-series data of the current difference ΔI in a period in which the gear shift ratio is switched when it is determined that an abnormality has occurred. The time-series data of the current difference ΔI are data having a correlation with a cause of an abnormality.

Figure 6A:
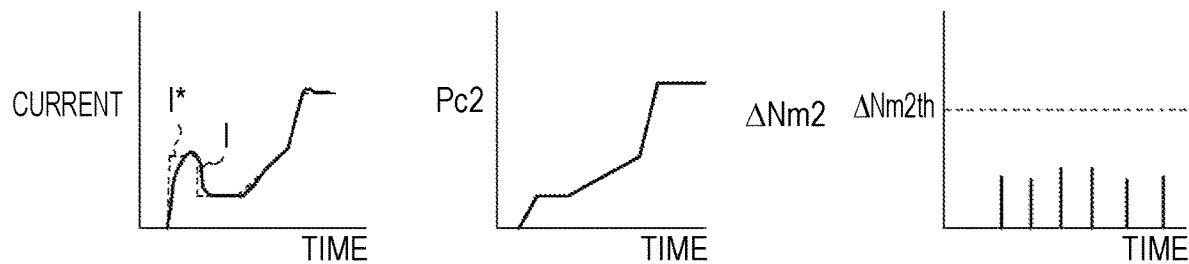
FIG. 6A is a timing chart illustrating a relationship between a behavior of a rotation speed at the time of gear shifting and an abnormality cause according to the first embodiment.
Figure 6B:
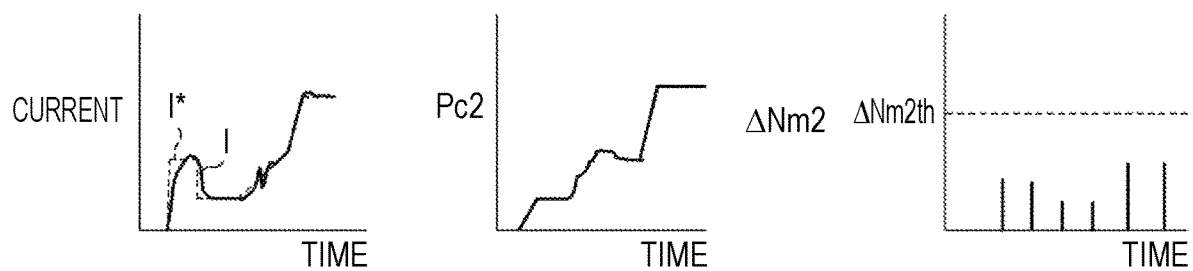
FIG. 6B is a timing chart illustrating a relationship between a behavior of a rotation speed at the time of gear shifting and an abnormality cause according to the first embodiment.
Figure 6C:
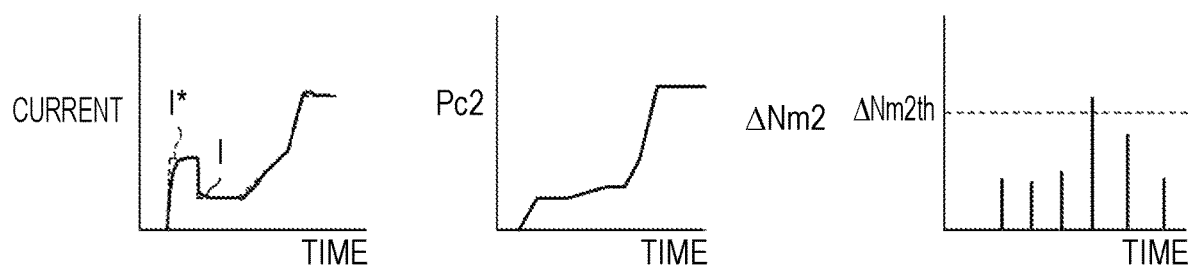
FIG. 6C is a timing chart illustrating a relationship between a behavior of a rotation speed at the time of gear shifting and an abnormality cause according to the first embodiment.
Figure 6D:
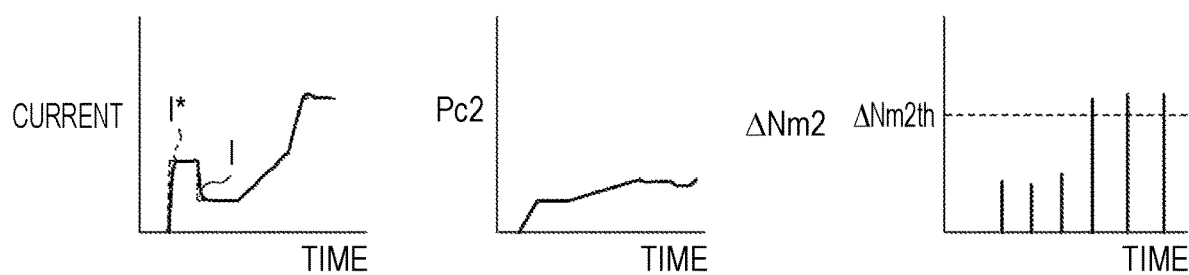
FIG. 6D is a timing chart illustrating a relationship between a behavior of a rotation speed at the time of gear shifting and an abnormality cause according to the first embodiment.

FIGS. 6A to 6D illustrate changes of the current I, the hydraulic pressure Pc2, and a blow amount ΔNm2 by which the rotation speed Nm2 is higher than the reference rotation speed Nm2* at the time of gear shift. Six sampled values of the blow amount ΔNm2 are illustrated in the right parts of FIGS. 6A to 6D. Here, FIG. 6A illustrates an example of the changes in a normal state and FIGS. 6B to 6D illustrate examples of the changes in an abnormal state.

Specifically, FIG. 6B illustrates an example in which the rotation speed Nm2 exhibits a behavior different from that in a normal state because air is mixed into the solenoid valves 28a and an abnormality occurs in control of the hydraulic pressure Pc2 by feedback control. The actual behavior of the current at this time is different from that in a normal state. FIG. 6C illustrates an example in which foreign substance is mixed into the solenoid valves 28a and a temporary stick which is an abnormality in which the valves do not operate temporarily occurs. In this case, the blow amount ΔNm2 temporarily exceeds a threshold value Nm2th due to temporary bluntness of an increase of the hydraulic pressure Pc2. The behavior of the current I at this time is different from that illustrated in FIG. 6B. FIG. 6D illustrates an example in which foreign substance is mixed into the solenoid valves 28a and a full stick which is an abnormality in which the valves do not operate normally occurs. In this case, since the hydraulic pressure Pc2 is low, the frictional engagement elements are not switched to the engaged state and a state in which the blow amount ΔNm2 is greater than the threshold value Nm2*th* is continued. The behavior of the current I in this case is also different from that illustrated in FIG. 6B.

Referring to FIG. 5, the CPU 42 reads current differences ΔI(−p+1), ΔI(−p+2), . . . , and ΔI(−p+n) which are time-series data of the current difference ΔI stored in the process of S14 in FIG. 3 in a period in which the same switching of a gear shift ratio as when an abnormality has occurred is performed before it is determined that an abnormality has occurred (S48). Here, the "same switching of a gear shift ratio as when an abnormality has occurred" means that the gear shift type and the accelerator operation amount ACCP are in the same area as when an abnormality has occurred out of areas A1, A2, . . . which are used to set the hydraulic pressure command value P0* illustrated in FIG. 2. It is more preferable to further employ a condition that an absolute value of a difference in oil temperature Toil from that when an abnormality has occurred is equal to or less than a predetermined value.

Then, the CPU 42 substitutes the time-series data acquired in the processes of S46 and S48 into input variables x(1) to x(2n) of a map which is defined by the first map data DM1 selected in the process of S44 (S50). That is, with "i=1 to n," the current difference ΔI(i) is substituted into the input variable x(i) and the current difference ΔI(−p+i) is substituted into the input variable x(n+i).

Then, the CPU 42 calculates values of output variables y(1), y(2), . . . , y(q) by substituting the values of the input variables x(1) to x(2n) to the map which is defined by the first map data DM1 selected in the process of S44 (S52).

In the first embodiment, a function approximation operator is exemplified as a map and, for example, a total-binding forward-propagation type neural network with a single intermediate layer is exemplified. Specifically, a value of a node of the intermediate layer is determined by substituting "m" values obtained by converting the input variables x(1) to x(2n) into which values are substituted in the process of S50 and a bias parameter x(0) using a linear map which is defined by coefficients wFjk (where j=1 to m, k=0 to 2n) into an activation function f. In addition, values of the output variables y(1), y(2), y(3), . . . are determined by substituting values, which are obtained by converting the value of the node of the intermediate layer using the linear map defined by the coefficients wSij, into an activation function g. In the first embodiment, a hyperbolic tangent function is exemplified as the activation function f. A softmax function which is a smooth curve and which maximizes one output value is exemplified as the activation function g.

As illustrated in FIG. 7, the output variables y(1), y(2), y(3), . . . are cause variables for identifying a cause of an abnormality. In FIG. 7, the output variable y(1) indicates a probability that the mixture of air illustrated in FIG. 6B will occur, the output variable y(2) indicates a probability that a temporary stick illustrated in FIG. 6C will occur, and the output variable y(3) indicates a probability that a full stick illustrated in FIG. 6D will occur.

Referring back to FIG. 5, the CPU 42 selects a maximum value ymax out of the output variables y(1) to y(q) (S54). Then, the CPU 42 identifies a cause of the abnormality based on the same output variable as the maximum value ymax out of the output variables y(1) to y(q) and stores the result of identification of the cause in the storage device 46 (S56). For example, when the value of the output variable y(1) is the same as the maximum value ymax, the CPU 42 stores data indicating that the cause of determination of the abnormality is the mixture of air in the storage device 46.

The CPU 42 temporarily ends a series of processes illustrated in FIGS. 6A to 6D when the process of S56 has been completed or when the determination result of the process of S40 is negative. Each of the first map data DM1 is a model trained using the current difference ΔI obtained by driving a prototype vehicle or the like and data indicating whether an actual abnormality has occurred as training data before shipment of the vehicle VC.

Figure 8:
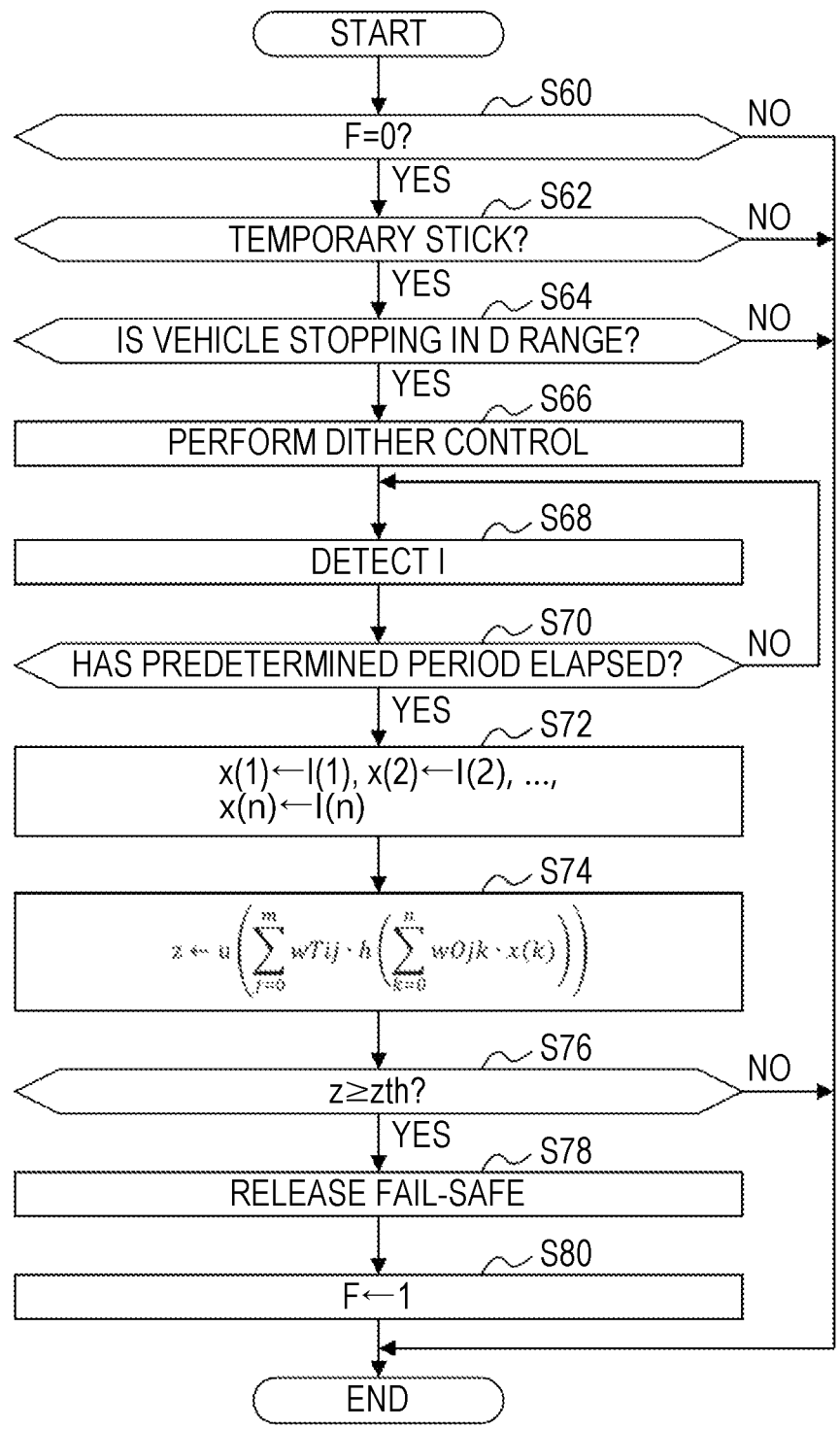
FIG. 8 is a flowchart illustrating a process flow which is performed by the control device according to the first embodiment.

FIG. 8 illustrates another flow of processes which are performed by the control device 40. The processes illustrated in FIG. 8 are realized by causing the CPU 42 to repeatedly execute a program stored in the ROM 44, for example, at intervals of a predetermined period.

In a series of processes illustrated in FIG. 8, the CPU 42 first determines whether the fail flag F is "0" (S60). When it is determined that the fail flag F is "0" (S60: YES), the CPU 42 determines whether a cause of setting the fail flag F to "0" is a temporary stick (S62). That is, the CPU 42 determines whether the output variable y(2) has a maximum value ymax. When it is determined that the cause is a temporary stick (S62: YES), the CPU 42 determines whether the vehicle is stopping in the D range (S64). When it is determined that the vehicle is stopping in the D range (S64: YES), the CPU 42 performs dither control for causing a small current to flow in the solenoid valve 28*a* having the temporary stick occurred and causing the solenoid valve 28*a* to vibrate finely by increasing or decreasing the current (S66). Then, the CPU 42 detects the current I of the solenoid valve 28*a* having the temporary stick occurred (S68).

The CPU 42 continues to detect the current I in a predetermined sampling period until a predetermined period elapses after the positive determination result has been acquired in the process of S64 (S70: NO). The predetermined period is set to a time with a predetermined length such that waveform information of the current I is obtained. When it is determined that the predetermined period has elapsed (S70: YES), the CPU 42 substitutes the currents I(1), I(2), . . . , I(n), which are time-series data detected in the process of S68 in the predetermined period, as the input variables x(1) to x(n) of the map which is defined by the second map data DM2 stored in the storage device 46 illustrated in FIG. 1 (S72).

Then, the CPU 42 calculates the value of an output variable z by substituting the values of the input variables x(1) to x(n) to a map which is defined by the second map data DM2 (S74). In the first embodiment, a function approximation operator is exemplified as the map and, specifically, a total-binding forward-propagation type neural network with a single intermediate layer is exemplified. Specifically, a value of a node of the intermediate layer is determined by substituting "m" values obtained by converting the input variables x(1) to x(n) into which values are substituted in the process of S72 and the bias parameter x(0) using a linear map which is defined by coefficients wOjk (where j=1 to m, k=0 to n) into an activation function h. In addition, values of the output variable z are determined by substituting values, which are obtained by converting the value of the node of the intermediate layer using the linear map defined by the coefficients wTij, into an activation function u. In the first embodiment, a hyperbolic tangent function is exemplified as the activation function h. A logistic sigmoid function is exemplified as the activation function u.

The second map data DM2 is a model trained using the gear shifting device 26 of a vehicle with the same specifications as the vehicle VC and using the current I in dither control when an abnormality has occurred and when no abnormality has occurred as training data before shipment of the vehicle VC. At this time, a target value of the output variable z is "1" when no abnormality has occurred and "0" when an abnormality has occurred.

The CPU 42 determines whether the value of the output variable z is equal to or greater than a threshold value zth (S76). This process is a process of determining whether the abnormality has been relieved. When it is determined that the value of the output variable z is equal to or greater than the threshold value zth (S76: YES), the CPU 42 determines that the abnormality has been relieved, and releases the fail-safe process (S78). The CPU 42 substitutes "1" into the fail flag (S80).

The CPU 42 temporarily ends a series of processes illustrated in FIG. 8 when the process of S80 has been completed or when the determination results of S60, S62, S64, and S76 are negative. Operations and advantages of the first embodiment will be described below.

The CPU 42 determines that an abnormality has occurred in gear shift control based on the fact that the absolute value of the difference between the rotation speed Nm2 in a switching period of the gear shift ratio and the reference rotation speed Nm2* is equal to or greater than a threshold value ΔNm2th. When it is determined that an abnormality has occurred, the CPU 42 performs the fail-safe process and notifies a user that an abnormality has occurred. When it is determined that an abnormality has occurred, the CPU 42 determines whether the abnormality has been relieved based on the behavior of a turn-on current when dither control is performed for the solenoid valve 28a with the abnormality occurred. That is, the dither control is control for causing the solenoid valve 28a to vibrate finely, but the solenoid valve 28a does not vibrate actually when an abnormality such as a temporary stick has not been relieved. The behavior of the turn-on current of the solenoid valve 28a varies depending on whether the solenoid valve 28a vibrates. When it is determined that the abnormality has been relieved, the CPU 42 releases the fail-safe process. Accordingly, when an abnormality which is to be relieved in a short time has occurred, it is possible to rapidly return the gear shift ratio of the gear shifting device 26 to a normal value for making drivability or the like excellent.

The following advantages are obtained according to the first embodiment described above. (1) Time-series data of the current I of the solenoid valve 28a is included in input variables of a map which is defined by the second map data DM2. Accordingly, since the behavior variable which is a variable associated with the behavior of the turn-on current of the solenoid valve 28a can be used as an input variable, it is possible to accurately determine whether an abnormality of the solenoid valve 28a has been relieved.

(2) When it is determined that an abnormality has occurred, whether the abnormality has been relieved is determined based on the behavior of the turn-on current in dither control on condition that a cause of the abnormality is a temporary stick. Accordingly, it is possible to curb useless performing of the relief determining process when an abnormality which cannot be expected to be relieved occurs.

(3) Dither control is performed on condition that the vehicle is stopping in the D range. Accordingly, even when the frictional engagement element exhibits an unintended behavior due to the dither control, it is possible to curb hindrance in travel of the vehicle VC.

(4) When it is determined that an abnormality has occurred, the CPU 42 identifies a cause of the abnormality based on the behavior of the turn-on current of the solenoid valve 28a when the abnormality has occurred, and stores the result of identification in the storage device 46. Accordingly, an entity that determines what treatment to perform on the vehicle can determine the treatment based on the result of identification stored in the storage device 46, for example, when a user having been notified of an alarm drives the vehicle to a repair shop.

(5) The current difference ΔI instead of the current I is used as the input variable of the map which is defined by the first map data DM1. In the first embodiment, since the hydraulic pressure command value P0* is corrected based on the correction value ΔP, the current command value I* varies depending on the correction value ΔP even in the same area which is defined by the accelerator operation amount ACCP and the gear shift type. Even when the area defined by the accelerator operation amount ACCP and the gear shift type is the same and the oil temperature Toil is the same, the current command value I* varies due to map calculation. Accordingly, the behavior of the current I varies depending on the current command value I*, which is not directly associated with an abnormality. Accordingly, by using the current difference ΔI instead of the current I, it is possible to curb variation of the input variable x due to variation of the current command value I*. In this way, by processing information serving as an abnormality cause as a feature and inputting the processed information to a map, it is possible to more accurately calculate the value of the output variable.

(6) Time-series data of the current difference ΔI are included in the input variables of the map which is defined by the first map data DM1. Since the time-series data represents the behavior of the turn-on current of the solenoid valve 28a, a variable representing the behavior of the turn-on current of the solenoid valve 28a can be used as an input variable in the first embodiment.

(7) In addition to the current differences ΔI(1) to ΔI(n) in the current period in which the gear shift ratio is switched in the gear shifting device 26, the current differences ΔI(−p+1) to and ΔI(−p+n) when the same switching was performed in the past are included in the input variables which are simultaneously input to the map which is defined by the first map data DM1. Accordingly, it is possible to calculate a value of a cause variable in consideration of a history and trends in the behavior of the current.

Hereinafter, a second embodiment of the disclosure will be described with reference to the drawings with a focus on differences from the first embodiment.

Figure 9:
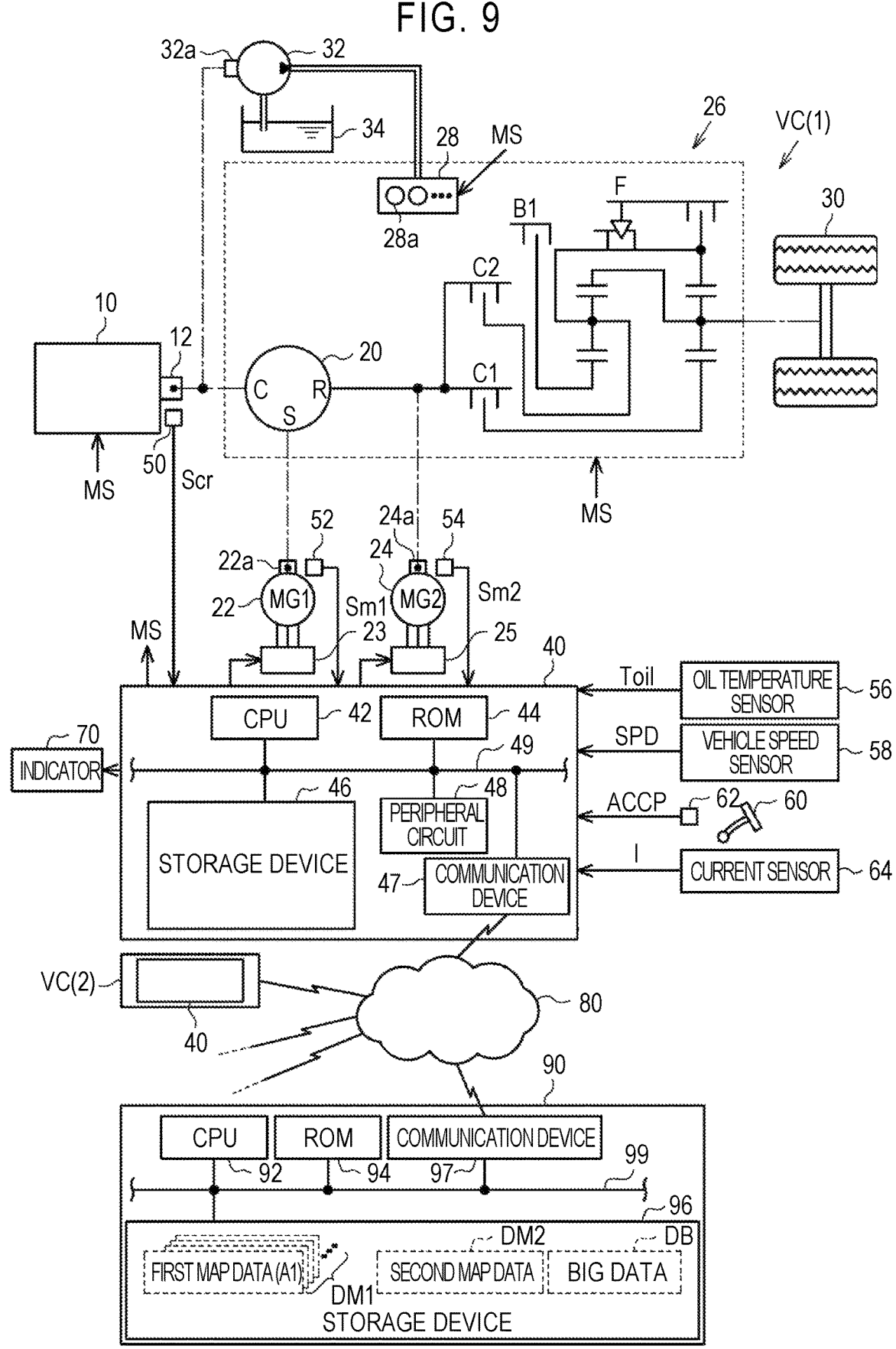
FIG. 9 is a diagram illustrating a configuration of a system according to a second embodiment of the disclosure.

FIG. 9 illustrates a configuration of a system according to the second embodiment. In FIG. 9, elements corresponding to the elements illustrated in FIG. 1 will be referred to by the same reference signs for the purpose of convenience, and description thereof will not be repeated. As illustrated in FIG. 9, the control device 40 of a vehicle VC(1) includes a communication device 47 and can communicate with a data analysis center 90 via an external network 80 using the communication device 47.

The data analysis center 90 collects and analyzes data transmitted from a plurality of vehicles VC(1), VC(2), . . . as big data DB. The data analysis center 90 includes a CPU 92, a ROM 94, a storage device 96, and a communication device 97, which can communicate with each other via a local network 99. The storage device 96 is a nonvolatile memory which is electrically rewritable, and stores first map data DM1 and second map data DM2 in addition to the big data DB.

FIGS. 10A and 10B illustrate a flow of processes associated with release of a fail-safe process based on an output variable z which is performed by the system illustrated in FIG. 9. Specifically, the processes illustrated in FIG. 10A are realized by causing the CPU 42 to repeatedly execute a program stored in the ROM 44, for example, at intervals of a predetermined period. The processes illustrated in FIG. 10B are realized by causing the CPU 92 to repeatedly execute a program stored in the ROM 94, for example, at intervals of a predetermined period. In the processes illustrated in FIGS. 10A and 10B, processes corresponding to the processes illustrated in FIG. 8 will be referred to by the same step numbers for the purpose of convenience and description thereof will not be repeated. A series of processes illustrated in FIGS. 10A and 10B will be described below along a time series of the processes associated with release of the fail-safe process.

In a series of processes illustrated in FIG. 10A, the CPU 42 first performs the processes of S60 to S70 and then transmits time-series data of the current I detected in the process of S68 along with an identifier of the vehicle by operating the communication device 47 (S90).

On the other hand, as illustrated in FIG. 10B, the CPU 92 of the data analysis center 90 receives the time-series data along with the identifier of the vehicle (S100). Then, the CPU 92 performs the processes of S72 and S74. Then, the CPU 92 transmits data associated with a value of the output variable z calculated in the process of S74 to a transmission source of the data received in the process of S100 by operating the communication device 47 (S102).

On the other hand, as illustrated in FIG. 10A, the CPU 42 receives the data associated with the value of the output variable z (S92). Then when it is determined that the value of the output variable z is equal to or greater than the threshold value zth (S76: YES), the CPU 42 performs the processes of S78 and S80. On the other hand, when it is determined that the value of the output variable z is less than the threshold value zth (S76: NO), the CPU 42 increments the counter C (S94). Then, the CPU 42 determines whether the counter C is equal to or greater than a predetermined value Cth (S96). This process is a process of determining whether the result of determination indicating that the abnormality is a temporary stick is reliable. Then, when it is determined that the counter C is equal to or greater than the predetermined value Cth (S96: YES), the CPU 42 notifies that the result of determination indicating that the abnormality is a temporary stick is less reliable by operating the communication device 47 (S98).

The CPU 42 temporarily ends a series of processes illustrated in FIG. 10A when the processes of S80 and S98 have been completed or when the determination results of S60, S62, S64, and S96 are negative.

On the other hand, as illustrated in FIG. 10B, the CPU 92 determines whether it has been fed back that the result of determination indicating that the abnormality is a temporary stick is less reliable (S104). When it is determined that it has been fed back (S104: YES), the CPU 92 receives data associated with the feedback (S106). The received data includes the identifier of the vehicle in which the process of S98 has been performed or data associated with the type of the solenoid valve 28a with an abnormality occurred.

The CPU 92 temporarily ends a series of processes illustrated in FIG. 10B when the process of S106 has been completed or when the determination result of the process of S104 is negative. FIGS. 11A and 11B illustrate a flow of a process of determining an abnormality cause based on the output variables y(1), y(2), . . . .

Specifically, the processes illustrated in FIG. 11A are realized by causing the CPU 42 to repeatedly execute a program stored in the ROM 44, for example, at intervals of a predetermined period. The processes illustrated in FIG. 11B are realized by causing the CPU 92 to repeatedly execute a program stored in the ROM 94, for example, at intervals of a predetermined period. In the processes illustrated in FIGS. 11A and 11B, processes corresponding to the processes illustrated in FIG. 5 will be referred to by the same step numbers for the purpose of convenience and description thereof will not be repeated. A series of processes illustrated in FIGS. 11A and 11B will be described below along a time series of the process of determining an abnormality cause based on the output variables y(1), y(2), . . . .

As illustrated in FIG. 11A, the CPU 42 of the control device 40 performs the processes of S40, S42, S46, and S48 and then transmits time-series data read in the processes of S42, S46, and S48 along with an identifier of the vehicle VC(1) by operating the communication device 47 (S110).

On the other hand, as illustrated in FIG. 11B, the CPU 92 of the data analysis center 90 receives the data and the identifier transmitted in the process of S90 (S120). Then, the CPU 92 performs the processes of S44 and S50 to S54 using the received data. Then, the CPU 92 transmits data associated with the result of determination of an abnormality cause based on a variable with a maximum value ymax out of the output variables y(1) to y(q) to a transmission source of the data received in the process of S120 by operating the communication device 97, and stores the data in the storage device 96 (S122).

On the other hand, as illustrated in FIG. 11A, the CPU 42 receives data associated with the result of determination transmitted in the process of S122 (S112). Then, the CPU 42 stores the result of determination in the storage device 46 (S114).

The CPU 42 temporarily ends a series of processes illustrated in FIG. 11A when the process of S114 has been completed or when the determination result of the process of S40 is negative. Accordingly, when a user drives the vehicle VC(1) to a repair shop through the alarm process of S32 in FIG. 3, the repair shop can understand the abnormality cause by accessing the storage device 46. For example, when a result of determination indicating that the abnormality is a fixed stick is stored and the abnormality in gear shift control is relieved, the repair shop identifies the abnormality cause. When it is verified that the result of determination is not right, the repair shop notifies the data analysis center 90 of data indicating the fact.

On the other hand, as illustrated in FIG. 11B, the CPU 92 of the data analysis center 90 determines whether feedback from the repair shop or feedback based on the process of S98 in FIG. 10A has been performed (S124). When the feedback has been performed (S124: YES), the CPU 92 updates the first map data DM1 such that the value of the output variable of the map which is defined by the first map data DM1 with the values of the input variables x(1) to x(2n) input thereto when the erroneous determination has been performed represents a correct abnormality cause which has been fed back (S126).

The CPU 92 temporarily ends a series of processes illustrated in FIG. 11B when the process of S126 has been completed or when the determination result of the process of S124 is negative. In this way, according to the second embodiment, it is possible to decrease a calculation load of the CPU 42 by causing the outside of the vehicle VC(1) to perform the processes of S52 and S74. When the result of determination of a cause in the processes of S52 to S54 is erroneous, the first map data DM1 can be updated. Particularly, a result of determination of a cause using a map defined by the first map data DM1 for an abnormality having occurred in various driving situations by various users after the vehicles VC(1), VC(2), . . . have been shipped can be verified.

Correspondence in elements between the claims and the embodiment will be described below. The correspondence is described below in the order of description in the "SUMMARY." An example of a "frictional engagement element" is clutches C1 and C2 and a brake B1. An example of an "abnormality determining process" corresponds to the processes of S16 to S28. An example of a "fail-safe process" is the process of S30. An example of a "relief determining process" is the process of S76. An example of a "release process" is the process of S78. An example of a "control device" is the control device 40. An example of an "operation process" is the process of S66. An example of a "storage device" is the storage device 46 or 96. An example of a "storage process" is the process of S34, the process of S56 or the process of S114. An example of a "first electronic control unit" is the CPU 42 or the ROM 44. An example of a "second electronic control unit" is the CPU 92 and the ROM 94. An example of "map data" is the second map data DM2. An example of an "acquisition process" is the process of S46, the process of S48 or the process of S68. An example of an "identification process" is the processes of S50 to S54. An example of an "alarm process" is the process of S32. An example of a "behavior variable at a previous timing" is the current differences $\Delta I(-p+1), \Delta I(-p+2), \ldots,$ and $\Delta I(-p+n)$. An example of a "data transmitting process" is the process of S90 or the process of S110. An example of a "reception process" is the process of S120. An example of an "update process" is the process of S126. An example of an "external arithmetic operation device" is the data analysis center 90.

This embodiment can be modified in other forms as follows. This embodiment and the following modified examples can be combined with each other unless a technical confliction arises.

A selection process will be described below. In the aforementioned embodiment, the accelerator operation amount ACCP is used as a torque variable which is a variable indicating a torque applied to the driving wheels 30, but the disclosure is not limited thereto. For example, a command value for a drive torque which is determined from the accelerator operation amount ACCP may be calculated and the calculated command value for the torque may be used as the torque variable.

In the aforementioned embodiment, processes of selecting one of a plurality of pieces of first map data DM1(A1), DM1(A2), . . . which are different based on a torque variable and a gear shift type and using the selected one as map data which is used to calculate the values of the output variables y(1), y(2), . . . have been described above, but the disclosure is not limited thereto. For example, a plurality of pieces of first map data which are different based on a torque variable regardless of a gear shift type may be provided, one thereof may be selected based on the torque variable and used as map data which is used to calculate the values of the output variables y(1), y(2), . . . . For example, a plurality of pieces of first map data which are different based on a gear shift type regardless of a torque variable may be provided, one thereof may be selected based on the gear shift type and used as map data which is used to calculate the values of the output variables y(1), y(2), . . . .

The selection process is not limited to the process of selecting one of a plurality of pieces of first map data DM1 which are different from each other based on at least one of two variables including the torque variable and the gear shift type. For example, the selection process may be a process of selecting one of a plurality of pieces of first map data DM1 which are different from each other based on the oil temperature Toil. This can be realized by providing a plurality of pieces of first map data DM1 which are different from each other based on the oil temperature Toil regardless of the torque variable and the gear shift type. A plurality of pieces of first map data DM1 which are different based on at least one of two variables of the torque variable and the gear shift type and the oil temperature Toil may be provided, and thus one of a plurality of pieces of first map data DM1 may be selected.

The first map data DM1 for each area is not limited to data for each of areas in which the hydraulic pressure command value is set to different values. For example, an area in which the hydraulic pressure command value is the same may be partitioned into a plurality of subareas and map data pieces which are different may be provided for the subareas. In this case, since learning has only to be performed such that a map outputs an appropriate value of an output variable in a more limited situation, for example, it is possible to accurately calculate the value of the output variable in a situation in which the number of intermediate layers is small or to accurately calculate the value of the output variable in a situation in which the number of dimensions of the input variables is small.

The command values will be described below. In the aforementioned embodiment, the hydraulic pressure command value is determined for each subarea partitioned based on the accelerator operation amount ACCP, the gear shift type, and the oil temperature Toil, but the disclosure is not limited thereto. For example, the hydraulic pressure command value may be determined for each subarea partitioned based on only two of the three variables. For example, the hydraulic pressure command value may be determined for each subarea partitioned based on only one of the three variables.

It is not essential to correct the hydraulic pressure command value by a learning process. Regarding the behavior variable which is an input variable of a map which is defined by the first map data DM1, the current difference $\Delta I$ is exemplified as a current variable which is an input variable of the map which is defined by the first map data DM1 in the aforementioned embodiment, but the disclosure is not limited thereto. For example, the current I may be used. In this case, for example, when the hydraulic pressure command value is not corrected in the learning process as described above for the command value and a plurality of pieces of map data which are different based on the accelerator operation amount ACCP, the gear shift type, and the oil temperature Toil is provided as described above in the selection process, it is possible to accurately calculate the value of the output variable using the current I. When the current I is used, it is not essential that an amount of change of the hydraulic pressure command value in an area in which arbitrary map data is used is small.

In the aforementioned embodiment, the behavior variable which is an input variable of a map includes time-series data in a gear shifting period immediately before an abnormality has occurred in addition to the time-series data when the abnormality has occurred, but the disclosure is not limited thereto. For example, the behavior variable may include time-series data in a past gear shifting period immediately before an abnormality has occurred in addition to time-series data when the abnormality has occurred. For example, the behavior variable may include time-series data in a plurality of gear shifting periods before an abnormality has occurred in addition to time-series data when the abnormality has occurred.

It is not essential that the behavior variable which is an input variable of the map which is defined by the first map data DM1 includes time-series data in a gear shifting period immediately before an abnormality has occurred. The input variable of the map which is defined by the first map data DM1 may include time-series data of the rotation speed Nm2 or the blow amount ΔNm2.

An input variable of the map which is defined by the second map data DM2 will be described below. The input variable of the map which is defined by the second map data DM2 is not limited to time-series data of the current I. For example, a reference current in dither control may be set and time-series data of a difference therefrom may be used. The disclosure is not limited to the variable associated with time-series data of the turn-on current, and may employ, for example, the amplitude and the period of the current.

The abnormality determining process will be described below. In the aforementioned embodiment, when the determination result of the process of S20 is positive and gear shift is completed within a predetermined period, it is determined that an abnormality has occurred when the counter C is equal to or greater than the threshold value Cth, but the disclosure is not limited thereto. For example, when the determination result of the process of S20 is positive, it may be determined that an abnormality has occurred regardless of whether the gear shift is completed within the predetermined period.

The relief determining process will be described below. The relief determining process is not limited to a process using a model trained by machine learning. For example, whether the abnormality has been relieved may be determined based on a time which is required for the current I actually flowing in the solenoid valve 28a to vary over a predetermined value when the current command value is changed. In addition, when a stick has occurred, the time required for the current I to vary over the predetermined value is likely to increase in comparison with a case in which the stick has been relieved.

The result of determining indicating that a temporary stick has been relieved is used for only the process of releasing the fail-safe process, but the disclosure is not limited thereto. For example, the result of determination may be used for the process of notifying a user that an abnormality has been relieved.

The alarm process will be described below. In the aforementioned embodiment, the process of displaying visual information indicating that an abnormality has occurred using the indicator 70 as an alarm device has been described above, but the disclosure is not limited thereto. For example, a process of outputting auditory information indicating that an abnormality has occurred using a speaker as the alarm device may be employed.

The storage process will be described below. In the aforementioned embodiment, the storage device that stores the result of calculation of the output variable is set to the same device as the storage device that stores the first map data DM1, but the disclosure is not limited thereto.

Even when the values of the output variables y(1), y(2), . . . are calculated in the vehicle VC, it is not essential to perform the storage process. For example, instead of performing the storage process, a process of transmitting the result of calculation to a manufacturer of the vehicle VC, the data analysis center 90, or the like may be performed.

A vehicular control system will be described below. In the aforementioned embodiment, an entity that calculates the values of the output variables y(1), y(2), . . . and an entity that calculates the value of the output variable z are set to the same entity such as the data analysis center 90, but the disclosure is not limited thereto. For example, the output variable z may be calculated by the vehicle VC side. For example, it may be calculated by a device outside the vehicle VC other than the data analysis center 90.

In the aforementioned embodiment, the values of the output variables y(1), y(2), . . . are calculated by the data analysis center 90 for the purpose of updating of the first map data DM1, but the disclosure is not limited thereto. For example, even when the first map data DM1 is not updated, it is possible to decrease the calculation load of the CPU 42 by causing outside of the vehicle VC to calculate the values of the output variables y(1), y(2), . . . .

The data based on a detection value from the current sensor which is transmitted to calculate the values of the output variables y(1), y(2), . . . is not limited to data serving as the input variables x(1), x(2), . . . such as the current difference ΔI. For example, the current I may be employed. In this case, by transmitting the values of the variables required for calculating the current command value I* such as the accelerator operation amount ACCP, the gear shift type, and the oil temperature Toil to the data analysis center 90, the data analysis center 90 can calculate the current difference ΔI.

The destination to which the vehicle VC transmits the data based on detection values from sensors required for calculating the values of the output variables y(1), y(2) . . . is not limited to the entity that performs the process of calculating the values of the output variables y(1), y(2), . . . . For example, a data center that stores the big data DB and an analysis center that calculates the values of the output variables y(1), y(2), . . . may be separately provided and data based on the detection values of the sensors may be transmitted from the vehicle VC to the data center. In this case, the data center can transmit the received data and the like to the analysis center.

The destination to which the vehicle VC transmits the data based on detection values from sensors required for calculating the value of the output variable z is not limited to the entity that performs the process of calculating the value of the output variable z. For example, a data center that stores the big data DB and an analysis center that calculates the value of the output variable z may be separately provided and data based on the detection values of the sensors may be transmitted from the vehicle VC to the data center. In this case, the data center can transmit the received data and the like to the analysis center.

The destination to which the vehicle VC transmits the data based on detection values from sensors required for calculating the values of the output variables y(1), y(2), . . . is not limited to the entity that handles data from a plurality of vehicles VC(1), VC(2), . . . . For example, the destination may be a mobile terminal of a user of the vehicle VC. The mobile terminal can calculate the values of the output variables y(1), y(2), . . . .

The destination to which the vehicle VC transmits the data based on detection values from sensors required for calculating the value of the output variable z is not limited to the entity that handles data from a plurality of vehicles VC(1), VC(2), . . . . For example, the destination may be a mobile terminal of a user of the vehicle VC. The mobile terminal can calculate the values of the value of the output variable z.

The electronic control unit will be described below. The electronic control unit is not limited to an electronic control unit including the CPU 42 (92) and the ROM 44 (94) and performing software processes. For example, a dedicated hardware circuit such as an ASIC that performs at least a part of the software processes performed in the aforementioned embodiments in hardware may be provided. That is, the electronic control unit may have at least one of the following configurations (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing devices including a processor and a program storage device or the number of dedicated hardware circuits may be two or more.

The vehicle will be described below. The vehicle is not limited to a vehicle including the gear shifting device 26. Even when the gear shifting device 26 is not provided, it is effective to use the map to determine an amount of bubbles in a lubricant of the power split device 20 or an amount of bubbles in a lubricant of the internal combustion engine 10.

The vehicle is not limited to a series/parallel hybrid vehicle. For example, the vehicle may be a series hybrid vehicle or a parallel hybrid vehicle. The onboard rotary machine is not limited to a rotary machine including an internal combustion engine and a motor/generator. For example, a vehicle including an internal combustion engine but not including a motor/generator may be employed or, for example, a vehicle including a motor/generator but not including an internal combustion engine may be employed.

What is claimed is:

1. A control device for a gear shifting device, the gear shifting device applied to a vehicle and including frictional engagement elements and being configured to automatically change a gear shift ratio between an onboard motor and driving wheels, the control device comprising an electronic control unit configured to perform:
    an abnormality determining process of determining whether an abnormality of the gear shifting device has occurred;
    a fail-safe process of switching a frictional engagement element among the frictional engagement elements corresponding to the abnormality to a disengaged state and fixing the gear shift ratio of the gear shifting device when it is determined in the abnormality determining process that the abnormality has occurred;
    a relief determining process of determining whether the abnormality has been relieved based on a behavior of an input signal at a time of operating a drive device of the frictional engagement element corresponding to the abnormality on condition that the frictional engagement element is maintained in the disengaged state after it is determined in the abnormality determining process that the abnormality has occurred; and
    a release process of releasing the fail-safe process when it is determined in the relief determining process that the abnormality has been relieved.

2. The control device according to claim 1, wherein:
    the drive device includes a solenoid valve; and
    the relief determining process includes a process of determining whether the abnormality has been relieved based on a behavior of a turn-on current as the input signal of the solenoid valve.

3. The control device according to claim 1, wherein the electronic control unit is configured to perform an operation process of operating the drive device of the frictional engagement element corresponding to the abnormality on condition that the frictional engagement element is maintained in the disengaged state when it is determined in the abnormality determining process that the abnormality has occurred and the vehicle stops.

4. The control device according to claim 1, further comprising a storage device configured to store map data which is data for defining a map, wherein
    the electronic control unit is configured to perform the abnormality determining process, the fail-safe process, the relief determining process, and the release process,
    the electronic control unit is configured to perform an acquisition process of acquiring a behavior variable which is a variable indicating a behavior of the input signal and is configured to perform the acquisition process,
    the map includes the behavior variable as an input variable and includes a relief variable which is a variable indicating whether the abnormality has been relieved as an output variable, and
    the relief determining process includes a process of calculating a value of the relief variable by inputting a value of the behavior variable acquired in the acquisition process to the map.

5. The control device according to claim 4, wherein:
    the drive device includes a solenoid valve; and
    the input variable includes a variable associated with time-series data of a turn-on current of the solenoid valve as the behavior variable.

6. A control system for a gear shifting device, comprising: the control device according to claim 4, wherein
    the electronic control unit used in the control device includes a first electronic control unit that is provided in the vehicle and a second electronic control unit that is not provided in the vehicle,
    the drive device used in the control device includes a solenoid valve,
    the first electronic control unit is configured to perform at least the abnormality determining process, the fail-safe process, the release process, and a data transmitting process of transmitting data associated with a turn-on current of the solenoid valve, and
    the second electronic control unit is configured to perform at least the relief determining process.

7. The control device according to claim 1, wherein:
    the electronic control unit is configured to perform an identification process of identifying a cause of the abnormality when it is determined in the abnormality determining process that the abnormality has occurred and is configured to perform the identification process; and
    the electronic control unit is configured to perform the relief determining process on condition that the abnormality identified in the identification process is the abnormality associated with engagement of the frictional engagement elements.

8. The control device according to claim 7, wherein:
    the electronic control unit is configured to perform an alarm process of notifying that it has been determined in the abnormality determining process that the abnormality has occurred and a storage process of storing data associated with a result of identification in the identification process in a storage device; and the electronic control unit is configured to perform the alarm process and the storage process.

9. The control device according to claim 7, further comprising a storage device configured to store map data which is data for defining a map, wherein
the electronic control unit is configured to perform an acquisition process of acquiring a behavior variable which is a variable indicating a behavior of a turn-on current of the gear shifting device and is configured to perform the acquisition process,
the map includes the behavior variable as an input variable and includes a cause variable which is a variable indicating a type of the abnormality as an output variable, and
the identification process includes a process of calculating a value of the cause variable by inputting a value of the behavior variable acquired in the acquisition process to the map.

10. The control device according to claim 9, wherein:
the gear shifting device includes a solenoid valve; and
the input variable includes a variable associated with time-series data of a turn-on current of the solenoid valve as the behavior variable.

11. The control device according to claim 9, wherein:
the acquisition process includes a process of acquiring a value of the behavior variable at a previous timing in addition to the value of the behavior variable when it is determined in the abnormality determining process that the abnormality has occurred; and
the identification process includes a process of calculating the value of the cause variable by simultaneously inputting the value of the behavior variable, which is acquired in the acquisition process, when it is determined in the abnormality determining process that the abnormality has occurred and the value of the behavior variable at the previous timing to the map.

12. A control system for a gear shifting device, comprising:
the control device according to claim 9, wherein
the electronic control unit used in the control device includes a first electronic control unit that is provided in the vehicle and a second electronic control unit that is not provided in the vehicle,
the drive device used in the control device includes a solenoid valve,
the first electronic control unit is configured to perform at least the abnormality determining process, the fail-safe process, the release process, and a data transmitting process of transmitting data associated with a turn-on current of the solenoid valve, and
the second electronic control unit is configured to perform at least the identification process.

13. The control system according to claim 12, wherein the second electronic control unit is configured to perform a reception process of receiving data transmitted in the data transmitting process from a plurality of vehicles and an update process of calculating a value of the output variable by inputting the input variable based on the data received in the reception process to the map and updating the map data such that the calculated value is a target value.

* * * * *